United States Patent
Yu et al.

(10) Patent No.: US 7,480,743 B2
(45) Date of Patent: Jan. 20, 2009

(54) OPTIMIZED PERIPHERAL DEVICE CONFIGURATION DATA SEQUENTIAL HANDLING METHOD AND SYSTEM FOR COMPUTER PLATFORM

(75) Inventors: Ling-Hung Yu, Taipei (TW); Ying-Chih Lu, Taipei (TW); Chia-Hsing Lee, Taipei (TW)

(73) Assignee: Inventec Corporation, Taipei (TW)

( * ) Notice: Subject to any disclaimer, the term of this patent is extended or adjusted under 35 U.S.C. 154(b) by 314 days.

(21) Appl. No.: 11/378,658

(22) Filed: Mar. 15, 2006

(65) Prior Publication Data
US 2007/0220180 A1    Sep. 20, 2007

(51) Int. Cl.
*G06F 3/00* (2006.01)
(52) U.S. Cl. .................. 710/8; 710/9; 710/10; 710/14; 710/17; 713/1; 713/2
(58) Field of Classification Search ............... 710/8–10, 710/14, 17; 713/1, 2
See application file for complete search history.

(56) References Cited

U.S. PATENT DOCUMENTS 6,665,745 B1 * 12/2003 Masterson et al. ............ 710/17
2003/0074491 A1 * 4/2003 Cepulis ......................... 710/2

* cited by examiner

*Primary Examiner*—Tammara Peyton
(74) *Attorney, Agent, or Firm*—Jianq Chyun IP Office

(57) ABSTRACT

An optimized peripheral device configuration data sequential handling method and system is proposed, which is designed for use with a computer platform for providing the computer platform an optimized configuration data sequential handling function, which is characterized by the capability of performing a runtime data amount computing procedure for each set of the OPROM-embedded original configuration data from each connected peripheral device, such that an optimal handling sequence can be determined based on the runtime data amount for the handling of the configuration data in shadow RAM during initialization. This feature allows a shadow RAM unit having a limited capacity to support more peripheral devices at the same time, and also allows the utilization of the storage space of a shadow RAM to be more flexible and efficient.

12 Claims, 2 Drawing Sheets

OPTIMIZED PERIPHERAL DEVICE CONFIGURATION DATA SEQUENTIAL HANDLING METHOD AND SYSTEM FOR COMPUTER PLATFORM

BACKGROUND OF THE INVENTION

1. Field of the Invention

This invention relates to information technology (IT), and more particularly, to an optimized peripheral device configuration data sequential handling method and system which is designed for use with a computer platform equipped with a peripheral interface controller that is connectable with multiple peripheral devices, such as a PCI (Peripheral Component Interconnect) controller, for providing the PCI peripheral interface controller with an optimized configuration data sequential handling function that can sequentially handle the original configuration data stored in a built-in OPROM (Option ROM, where ROM=Read-Only Memory) in each of the connected peripheral devices by means of a shadow RAM (Random-Access Memory) having a limited capacity in an optimized manner.

2. Description of Related Art

PCI (Peripheral Component Interconnect) is a standard peripheral bus architecture that is widely utilized on computer platforms, such as desktop computers, notebook computers, and network servers. The PCI interface is used connecting the CPU (Central Processing Unit) of the computer platform externally to circuit cards that can be used for connections to various kinds of peripheral devices, such as monitor adapters, hard disk drives, CD-DVD drivers, network adapters, to name just a few, for the purpose of allowing the CPU to exchange data with these peripheral devices.

PCI peripheral devices are typically equipped with an OPROM (Option ROM, where ROM=Read-Only Memory) module for storing a set of configuration data about the associated peripheral device. When a PCI peripheral device is connected to a computer platform, the PCI peripheral interface controller can retrieve the OPROM-embedded configuration data from each connected peripheral device for initialization purpose. Fundamentally, RAM (Random-Access Memory) has a faster access speed than ROM (Read-Only Memory). Therefore, in order to speed up the initialization process, a special memory area, customarily referred to as "shadow RAM", is predefined in the RAM of the computer platform, such that during initialization process, the OPROM-embedded original configuration data can be copied to the shadow RAM for increased performance during the initialization process.

During actual operation, the computer platform will assign a storage area in the shadow RAM for each of the currently-connected peripheral devices, and then duplicate a shadow copy of the OPROM-embedded original configuration data to the assigned storage area in the shadow RAM for processing during initialization. For example, if there are 5 peripheral devices PCI(1), PCI(2), PCI(3), PCI(4), and PCI(5) which are installed to a PCI peripheral interface controller having 5 PCI buses PCI_BUS(1), PCI_BUS(2), PCI_BUS(3), PCI_BUS(4), and PCI_BUS(5) in such a manner that PCI(1) is installed to PCI_BUS(3); PCI(2) is installed to PCI_BUS(5); PCI(3) is installed to PCI_BUS(4); and PCI(5) is installed to PCI_BUS(2). Then, in this case, since the computer platform typically scans these 5 PCI buses in the sequence of PCI_BUS(1)→PCI_BUS(2)→PCI_BUS(3)→PCI_BUS(4)→PCI_BUS(5), the installed 5 PCI peripheral devices will be handled in the sequence of PCI(4)→PCI(5)→PCI(1)→PCI(3)→PCI(2). In this case, the computer platform will define 5 storage areas in the shadow RAM and handle the configuration of these 5 PCI peripheral devices in the sequence of PCI(4)→PCI(5)→PCI(1)→PCI(3)→PCI(2).

In practice, most computer platforms have a shadow RAM capacity of only 128 KB (kilobyte), within the address range of C0000h-DFFFFh. Therefore, the shadow RAM can only support a limited number of peripheral devices at the same time. For example, if a must-have peripheral device, such as a VGA adapter, has an OPROM-embedded original configuration data amount of 32 KB, then during initialization of the VGA adapter, its configuration data will take up 32 KB of memory space in the shadow RAM, and whereupon the remaining memory space of the shadow RAM will be 128−32=96 KB. Under this condition, the performance of the initialization of the other PCI peripheral devices will depend on their handling sequence. For example, if 4 PCI peripheral devices PCI(1), PCI(2), PCI(3), PCI(4) respectively have an OPROM-embedded original configuration data amount of 64 KB, 64 KB, 32 KB, and 24 KB, and whose runtime data amounts are respectively reduced to 6 KB, 32 KB, 32 KB, and 16 KB, then in this case, as shown in the following table, if the handling sequence for these 4 PCI peripheral device is PCI(1)→PCI(2)→PCI(3)→PCI(4), then all of these 4 PCI peripheral devices can be handled.

| Peripheral device Handling Sequence | Original Configuration Data Amount | Runtime Data Amount | Remaining Space of Shadow RAM |
|---|---|---|---|
| Priority 1: PCI(1) | 64 KB | 6 KB | 96 − 6 = 90 KB (>64 KB) |
| Priority 2: PCI(2) | 64 KB | 32 KB | 90 − 32 = 58 KB (>32 KB) |
| Priority 3: PCI(3) | 32 KB | 32 KB | 58 − 32 = 26 KB (>24 KB) |
| Priority 4: PCI(4) | 24 KB | 16 KB | 26 − 16 = 10 KB |

On the other hand, as shown in the following table, if the handling sequence for these 4 PCI peripheral device is PCI(2)→PCI(3)→PCI(4)→PCI(1), then only the first three of these 4 PCI peripheral devices can be handled.

| Peripheral device Handling Sequence | Original Configuration Data Amount | Runtime Data Amount | Remaining Space of Shadow RAM |
|---|---|---|---|
| Priority 1: PCI(2) | 64 KB | 32 KB | 96 − 32 = 64 KB (>32 KB) |
| Priority 2: PCI(3) | 32 KB | 32 KB | 64 − 32 = 32 KB (>24 KB) |
| Priority 3: PCI(4) | 24 KB | 16 KB | 32 − 16 = 16 KB (<64 KB) |
| Priority 4: PCI(1) | 64 KB | X | X |

From the above table, it can be seen that when the third-priority peripheral device PCI(4) is being handled, the remaining space of the shadow RAM is only 16 KB, which is insufficient to accommodate the 64 KB data amount of the fourth-priority peripheral device PCI(1); and therefore, the last peripheral device PCI(1) cannot be handled.

SUMMARY OF THE INVENTION

It is therefore an objective of this invention to provide an optimized peripheral device configuration data sequential handling method and system which allows a shadow RAM unit having a limited capacity to support more peripheral devices at the same time.

It is another objective of this invention to provide a optimized peripheral device configuration data sequential handling method and system which allows the utilization of the storage space of a shadow RAM to be more flexible and efficient.

The optimized peripheral device configuration data sequential handling method and system according to the invention is designed for use with a computer platform equipped with a peripheral interface controller that is connectable with multiple peripheral devices, such as a PCI controller, for providing the PCI peripheral interface controller with an optimized configuration data sequential handling function that can sequentially handle the original configuration data stored in a built-in OPROM in each of the connected peripheral devices by means of a shadow RAM having a limited capacity in an optimized manner.

The optimized peripheral device configuration data sequential handling method according to the invention comprises: (1) responding to a startup event on the computer platform by reading the original configuration data stored in the built-in option read-only memory unit of each peripheral device currently connected to the peripheral interface controller; (2) performing a runtime data amount computing procedure on each retrieved set of original configuration data from each peripheral device to thereby obtain the runtime data amount of the original configuration data during initialization; (3) determining an optimal handling sequence based on the runtime data amount of the original configuration data of each peripheral device; and (4) duplicating a shadow copy of the original configuration data stored in the built-in option read-only memory unit of each peripheral device to the shadow random-access memory unit successively in a sequence based the optimal handling sequence for initialization of each peripheral device.

In architecture, the optimized peripheral device configuration data sequential handling system according to the invention comprises: (A) an original configuration data reading module, which is capable of responding to a startup event on the computer platform by reading the original configuration data stored in the built-in option read-only memory unit of each peripheral device currently connected to the peripheral interface controller; (B) a runtime data amount computing module, which is capable of performing a runtime data amount computing procedure on each set of original configuration data retrieved by the original configuration data reading module from each peripheral device to thereby obtain the runtime data amount of the original configuration data during initialization; (C) a handling sequence determining module, which is capable of determining an optimal handling sequence based on the runtime data amount obtained by the runtime data amount computing module; and (D) a configuration data duplicating module, which is capable of duplicating a shadow copy of the original configuration data stored in the built-in option read-only memory unit of each peripheral device to the shadow random-access memory unit successively in a sequence based the optimal handling sequence determined by the handling sequence determining module for initialization of each peripheral device.

The optimized peripheral device configuration data sequential handling method and system for computer platform according to the invention is characterized by the capability of performing a runtime-data amount computing procedure for each set of the OPROM-embedded original configuration data from each connected peripheral device, such that an optimal handling sequence can be determined based on the runtime data amount for the handling of the configuration data in shadow RAM during initialization. This feature allows a shadow RAM unit having a limited capacity to support more peripheral devices at the same time, and also allows the utilization of the storage space of a shadow RAM to be more flexible and efficient.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The optimized peripheral device configuration data sequential handling method and system for computer platform according to the invention is disclosed in full details by way of preferred embodiments in the following with reference to the accompanying drawings.

Figure 1:
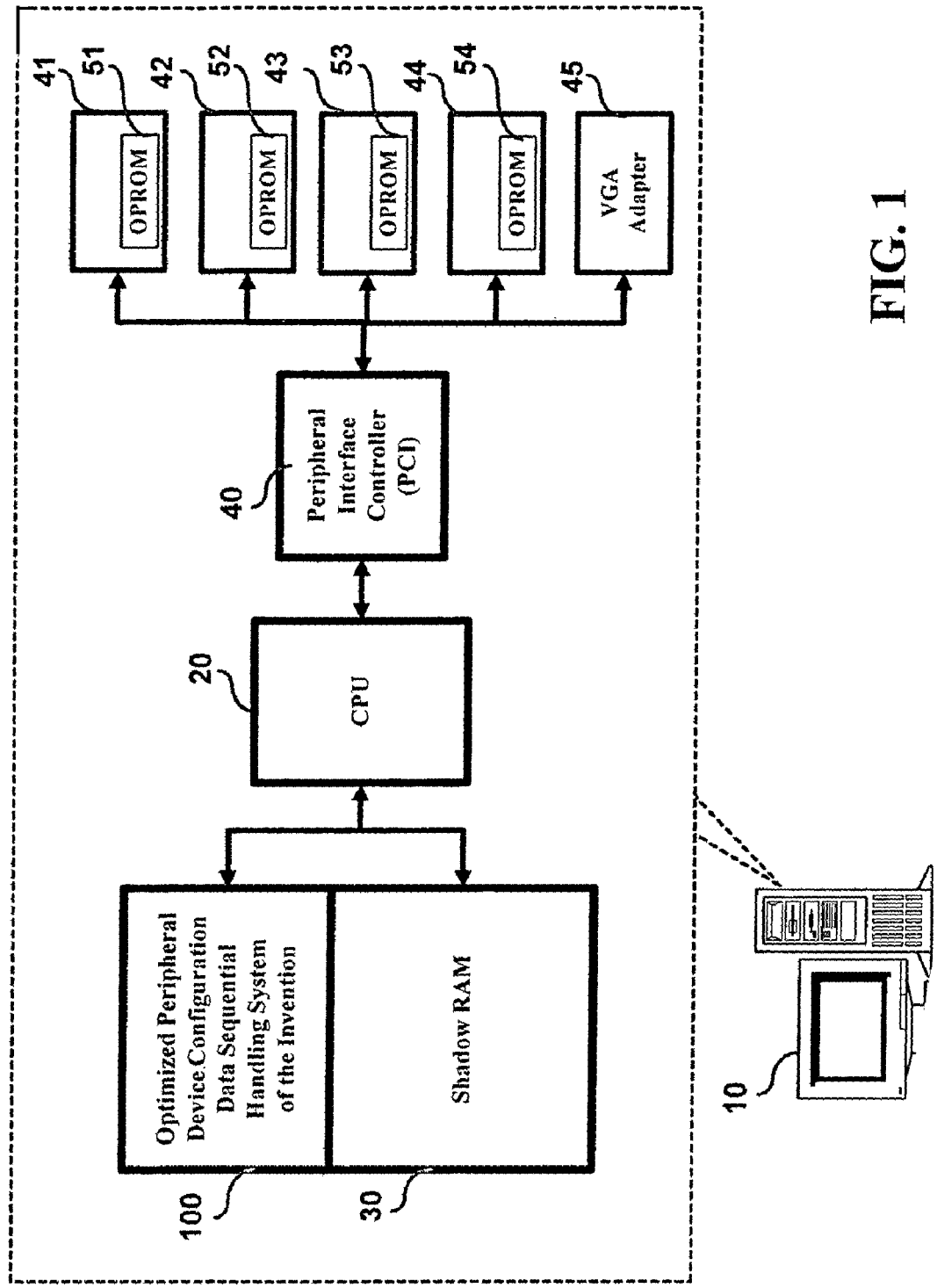
FIG. 1 is a schematic diagram showing the application of the optimized peripheral device configuration data sequential handling system of the invention with a computer platform.

FIG. 1 is a schematic diagram showing the application of the optimized peripheral device configuration data sequential handling system which is encapsulated in the block indicated by the reference numeral 100. As shown, the optimized peripheral device configuration data sequential handling system of the invention 100 is designed for use in conjunction with a computer platform 10 (such as a desktop computer, a notebook computer, or a network server) that is equipped with a central processing unit (CPU) 20, a shadow RAM (Random-Access Memory) unit 30, and a peripheral interface controller 40. In the embodiment of FIG. 1, for example, the peripheral interface controller 40 is a PCI (Peripheral Component Interconnect) compliant controller, which is capable of connecting to one or more PCI-compliant peripheral devices. In the example of FIG. 1, four peripheral devices 41, 42, 43, 44 and a VGA (Video Graphic Array) adapter 45 are shown to be connected to the PCI peripheral interface controller 40; but in practice, the maximum number of connectable peripheral devices is dependent on the capability of the shadow RAM unit 30. As a standard practice, the peripheral devices 41, 42, 43, 44 are each provided with a built-in OPROM (Option ROM, where ROM=Read-Only Memory) module, respectively designated by the reference numerals 51, 52, 53, 54, which are used to store a set of configuration data (hereinafter referred to as "original configuration data") that can be used for the initialization of the peripheral devices 41, 42, 43, 44 at startup of the computer platform 10.

In actual application, the optimized peripheral device configuration data sequential handling system of the invention 100 is capable of providing the PCI peripheral interface controller 40 with an optimized configuration data sequential handling function that can sequentially handle the OPROM-embedded original configuration data stored in the respective OPROM modules 51, 52, 53, 54 of the peripheral devices 41, 42, 43, 44 in an optimized sequence that allows the computer platform 10 to handle the initialization of the peripheral devices 41, 42, 43, 44 more efficiently, and also allows the PCI peripheral interface controller 40 to support more peripheral devices at the same time.

Figure 2:
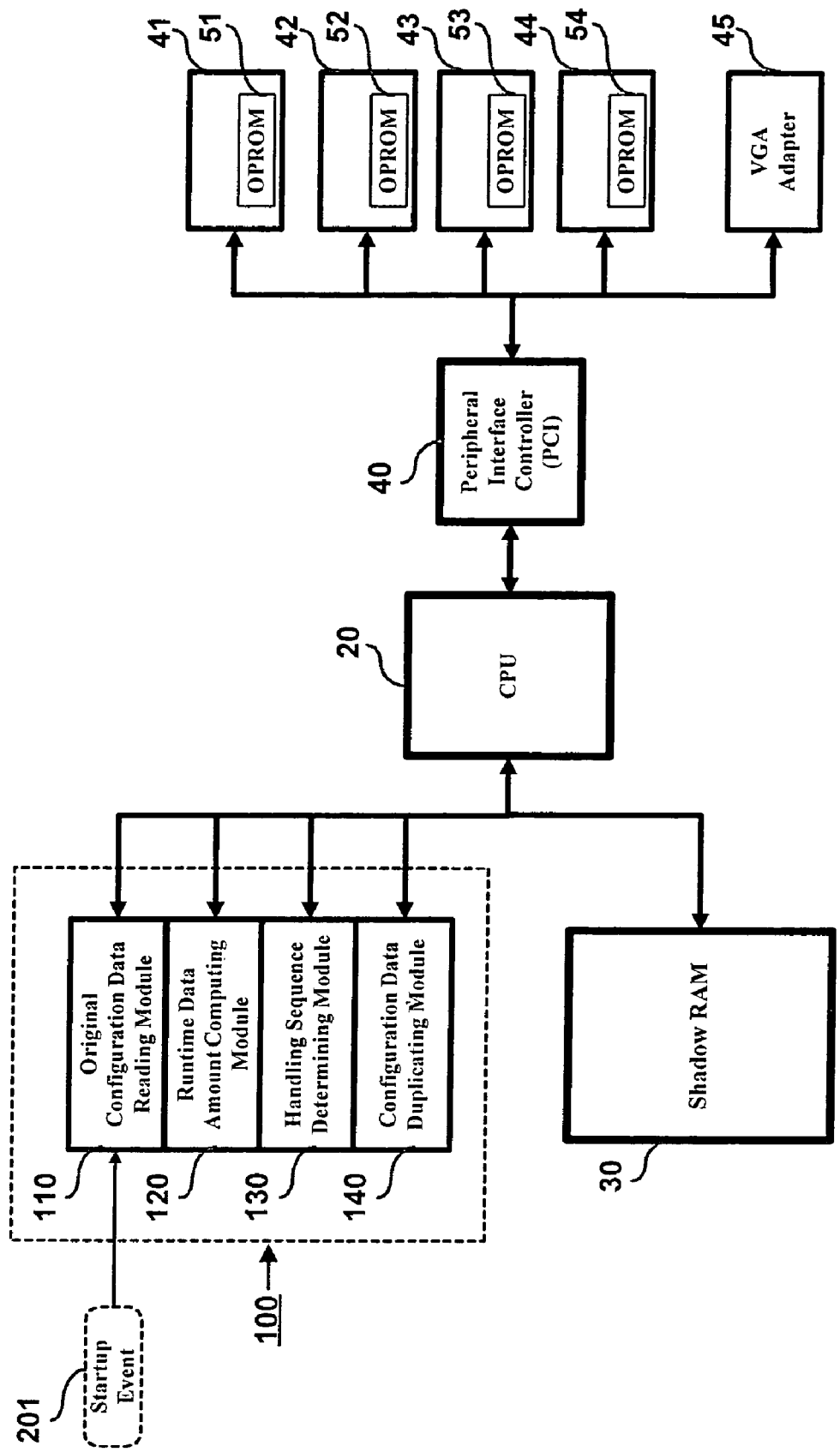
FIG. 2 is a schematic diagram showing the object-oriented component model of the optimized peripheral device configuration data sequential handling system of the invention.

As shown in FIG. 2, in architecture, the optimized peripheral device configuration data sequential handling system of the invention 100 is based on an object-oriented component model which comprises: (A) an original configuration data reading module 110; (B) a runtime data amount computing module 120; (C) a handling sequence determining module 130; and (D) a configuration data duplicating module 140. In practical implementation, the optimized peripheral device configuration data sequential handling system of the invention 100 can be fully realized by computer code and integrated as an add-on firm module to the BIOS (Basic Input/Output System) of the computer platform 10, such that the computer code can be executed by the CPU 20 to provide the intended optimized configuration data sequential handling function.

Firstly, the respective attributes and behaviors of the constituent components 110, 120, 130, 140, of the optimized peripheral device configuration data sequential handling system of the invention 100 are described in details in the following The original configuration data reading module 110 is designed to be capable of respond to a startup event 201 on the computer platform 10 (i.e., when the user switches on the computer platform 10) by reading the OPROM-embedded original configuration data stored in each of the built-in OPROM modules 51, 52, 53, 54 of the peripheral devices 41, 42, 43, 44.

The runtime data amount computing module 120 is capable of performing a runtime data amount computing procedure on each retrieved set of OPROM-embedded original configuration data from the peripheral devices 41, 42, 43, 44 to thereby obtain the runtime data amount of the original configuration data during initialization, i.e., the amount of actual configuration data that is handled in the shadow RAM unit 30 during initialization. Fundamentally, the runtime amount of configuration data is typically smaller than the amount of the original configuration data. For example, if the original configuration data amount of a peripheral device is 36 KB (kilobyte), then the runtime amount of the actually-used configuration data during initialization may be just 20 KB.

The handling sequence determining module 130 is capable of determining an optimal handling sequence based on the runtime data amount obtained by the runtime data amount computing module 120. The optimal handling sequence is such that the peripheral device having the smallest runtime data amount is assigned to the highest priority, the peripheral device having the second smallest runtime data amount is assigned to second highest priority, and so on. If two or more peripheral devices have exactly the same runtime data amount, then the peripheral device having the largest original configuration data is assigned to a higher priority. If the respective original configuration data of these peripheral devices are still exactly the same, then the peripheral device that was installed at the earliest time is assigned to a higher priority. For example, if there are four peripheral devices {PCI(1), PCI(2), PCI(3), PCI(4)} 41, 42, 43, 44 whose OPROM-embedded original configuration data are respectively 64 KB, 64 KB, 32 KB, and 24 KB, and whose runtime data amounts are respectively reduced to 6 KB, 32 KB, 32 KB, and 16 KB, then in this case, the optimal handling sequence will be PCI(1)→PCI(4)→PCI(2)→PCI(3).

The configuration data duplicating module 140 is capable of sequentially duplicating a shadow copy of the OPROM-embedded original configuration data stored in the OPROM modules 51, 52, 53, 54 of the peripheral devices 41, 42, 43, 44 to the shadow RAM unit 30 successively based on the optimal handling sequence determined by the handling sequence determining module 130, for the purpose of allowing the configuration data to be processed by the CPU 20 for initialization of each of the peripheral devices 41, 42, 43, 44.

The following is a detailed description of a practical application example of the optimized peripheral device configuration data sequential handling system of the invention 100 during actual operation. In this application example, it is assumed that the shadow RAM unit 30 has a capacity of 128 KB, and the PCI peripheral interface controller 40 is already connected with a VGA adapter 45 having an original configuration data amount of 32 KB and subsequently custom-connected with 4 peripheral devices 41, 42, 43, 44 whose OPROM-embedded original configuration data stored in the OPROM modules 51, 52, 53, 54 are respectively 64 KB, 64 KB, 32 KB, and 24 KB, and whose runtime data amounts are respectively reduced to 6 KB, 32 KB, 32 KB, and 16 KB during, initialization.

Referring to FIG. 1 together with FIG. 2, in actual operation, whenever the user switches on the computer platform 10 (i.e., initiating a startup event 201 on the computer platform 10), it causes the original configuration data reading module 110 to respond by reading the OPROM-embedded original configuration data stored in each of the built-in OPROM modules 51, 52, 53, 54 of the peripheral devices 41, 42, 43, 44. Next, the runtime data amount computing module 120 is activated to perform a runtime data amount computing procedure on each retrieved set of original configuration data from the peripheral devices 41, 42, 43, 44 to obtain the runtime data amount of the original configuration data during initialization. Subsequently, the handling sequence determining module 130 is activated to determine an optimal handling sequence based on the runtime data amount obtained by the runtime data amount computing module 120.

In this application example, since the respective OPROM-embedded original configuration data amounts of the four peripheral devices {PCI(1), PCI(2), PCI(3), PCI(4)} 41, 42, 43, 44 are 64 KB, 64 KB, 32 KB, and 24 KB, and whose runtime data amounts are respectively only 6 KB, 32 KB, 32 KB, and 16 KB, the optimal handling sequence is determined as PCI(1)→PCI(4)→PCI(2)→PCI(3).

Finally, the configuration data duplicating module 140 is activated to sequentially duplicating a copy of the original configuration data stored in the OPROM modules 51, 52, 53, 54 of the peripheral devices 41, 42, 43, 44 to the shadow RAM unit 30 in an order based on the optimal handling sequence determined by the handling sequence determining module 130, for the purpose of allowing the configuration data to be processed by the central processing unit 20 for initialization of each of the peripheral devices 41, 42, 43, 44.

In conclusion, the invention provides an optimized peripheral device configuration data sequential handling method and system for use with a computer platform for providing the computer platform an optimized configuration data sequential handling function, which is characterized by the capability of performing a runtime data amount computing procedure for each set of the OPROM-embedded original configuration data from each connected peripheral device, such that an optimal handling sequence can be determined based on the runtime data amount for the handling of the configuration data in shadow RAM during initialization. This feature allows a shadow RAM unit having a limited capacity to support more peripheral devices at the same time, and also allows the utilization of the storage space of a shadow RAM to be more flexible and efficient. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. An optimized peripheral device configuration data sequential handling method, adapted to a computer platform having a central processing unit, a shadow random-access memory unit, and a peripheral interface controller, wherein the peripheral interface controller is connectable to multiple peripheral devices each having a built-in option read-only memory unit for storing a set of original configuration data, the optimized peripheral device configuration data sequential handling method comprising:

responding to a startup event on the computer platform by reading the original configuration data stored in the built-in option read-only memory unit of each peripheral device currently connected to the peripheral interface controller;

performing a runtime data amount computing procedure on each retrieved set of original configuration data from each peripheral device to thereby obtain the runtime data amount of the original configuration data during initialization;

determining an optimal handling sequence based on the runtime data amount of the original configuration data of each peripheral device; and duplicating a shadow copy of the original configuration data stored in the built-in option read-only memory unit of each peripheral device to the shadow random-access memory unit successively in a sequence based on the optimal handling sequence for initialization of each peripheral device.

2. The optimized peripheral device configuration data sequential handling method of claim 1, wherein the computer platform is a desktop computer.

3. The optimized peripheral device configuration data sequential handling method of claim 1, wherein the computer platform is a notebook computer.

4. The optimized peripheral device configuration data sequential handling method of claim 1, wherein the computer platform is a network server.

5. The optimized peripheral device configuration data sequential handling method of claim 1, wherein the peripheral interface controller is a PCI (Peripheral Component Interconnect) compliant peripheral interface controller.

6. An optimized peripheral device configuration data sequential handling system, configured in a computer platform having a central processing unit, a shadow random-access memory unit, and a peripheral interface controller, wherein the peripheral interface controller is connectable to multiple peripheral devices each having a built-in option read-only memory unit for storing a set of original configuration data, the optimized peripheral device configuration data sequential handling system comprising:

an original configuration data reading module, used for reading the original configuration data stored in the built-in option read-only memory unit of each peripheral device currently connected to the peripheral interface controller in responding to a startup event on the computer platform;

a runtime data amount computing module, used for performing a runtime data amount computing procedure on each set of original configuration data retrieved by the original configuration data reading module from each peripheral device to thereby obtain the runtime data amount of the original configuration data during initialization;

a handling sequence determining module, used for determining an optimal handling sequence based on the runtime data amount obtained by the runtime data amount computing module; and a configuration data duplicating module, used for duplicating a shadow copy of the original configuration data stored in the built-in option read-only memory unit of each peripheral device to the shadow random-access memory unit successively in a sequence based on the optimal handling sequence determined by the handling sequence determining module for initialization of each peripheral device.

7. The optimized peripheral device configuration data sequential handling system of claim 6, wherein the computer platform is a desktop computer.

8. The optimized peripheral device configuration data sequential handling system of claim 6, wherein the computer platform is a notebook computer.

9. The optimized peripheral device configuration data sequential handling system of claim 6, wherein the computer platform is a network server.

10. The optimized peripheral device configuration data sequential handling system of claim 6, wherein the peripheral interface controller is a PCI (Peripheral Component Interconnect) compliant peripheral interface controller.

11. An optimized peripheral device configuration data sequential handling method, adapted to a computer platform having a central processing unit, a shadow random-access memory unit, and a peripheral interface controller, wherein the peripheral interface controller is connectable to a plurality of peripheral devices each having a built-in option read-only memory unit for storing a set of original configuration data, the optimized peripheral device configuration data sequential handling method comprising:

responding to a startup event on the computer platform by reading the original configuration data stored in the built-in option read-only memory unit of each peripheral device currently connected to the peripheral interface controller;

performing a runtime data amount computing procedure on each retrieved set of original configuration data from each peripheral device to thereby obtain the runtime data amount of the original configuration data during initialization;

determining an optimal handling sequence based on an original configuration data amount of each peripheral device and the runtime data amount of the original configuration data of each peripheral device; and duplicating a shadow copy of the original configuration data stored in the built-in option read-only memory unit of each peripheral device to the shadow random-access memory unit successively in a sequence based on the optimal handling sequence for initialization of each peripheral device.

12. The optimized peripheral device configuration data sequential handling method of claim 11, wherein the step of determining the optimal handling sequence includes arranging the peripheral devices in order from the peripheral device having the smallest runtime data amount to the peripheral device having the largest runtime data amount, wherein the peripheral device having the largest original configuration data amount is arranged first when two or more of the peripheral devices have the same runtime data amount.

* * * * *